United States Patent
Akashi et al.

(10) Patent No.: US 6,591,325 B1
(45) Date of Patent: Jul. 8, 2003

(54) METHOD AND APPARATUS OF OUT-OF-ORDER TRANSACTION PROCESSING USING REQUEST SIDE QUEUE POINTER AND RESPONSE SIDE QUEUE POINTER

(75) Inventors: Hideya Akashi, Kunitachi (JP); Yuji Tsushima, Kokubunji (JP); Keitaro Uehara, Kokubunji (JP); Naoki Hamanaka, Tokyo (JP); Toru Shonai, Hachioji (JP); Tetsuhiko Okada, Hachioji (JP); Masamori Kashiyama, Isehara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/547,392

(22) Filed: Apr. 11, 2000

(30) Foreign Application Priority Data

Apr. 14, 1999 (JP) .......................... 11-106194

(51) Int. Cl.[7] ............................. G06F 13/14
(52) U.S. Cl. ................................... 710/305
(58) Field of Search ......................... 710/305

(56) References Cited

U.S. PATENT DOCUMENTS

| | | | |
|---|---|---|---|
| 5,696,910 A | * 12/1997 | Pawlowski | 709/224 |
| 6,073,190 A | * 6/2000 | Rooney | 710/100 |
| 6,101,568 A | * 8/2000 | Richardson | 710/310 |
| 6,173,369 B1 | * 1/2001 | Nguyen et al. | 711/130 |
| 6,195,722 B1 | * 2/2001 | Ram et al. | 710/310 |
| 6,202,101 B1 | * 3/2001 | Chin et al. | 710/5 |
| 6,205,506 B1 | * 3/2001 | Richardson | 710/310 |
| 6,356,972 B1 | * 3/2002 | Chin et al. | 710/310 |

FOREIGN PATENT DOCUMENTS

JP      A-6-149730      5/1994

* cited by examiner

Primary Examiner—Sumati Lefkowitz
(74) Attorney, Agent, or Firm—Antonelli, Terry, Stout & Kraus, LLP (57) ABSTRACT

An information processing system that transfers transactions between a plurality of system modules. A request side interface unit in a request side module has a request ID queue in which issued request transactions are stored in order of issuance. A request side queue pointer points to an entry in this request ID queue corresponding to a response transaction to be accepted next. A response side interface unit in a response side module has a response queue in which accepted request transactions are stored in order of acceptance. A response side queue pointer points to an entry in this response queue corresponding to a response transaction to be issued next. Therefore, a request transaction and the corresponding response transaction are transferred between the request side interface unit and the response side interface unit without transferring transaction IDs. When the response order is changed, the response side interface unit issues a command, which changes the value of the request side queue pointer, to inform the request side interface unit of the change in the order.

8 Claims, 4 Drawing Sheets

METHOD AND APPARATUS OF OUT-OF-ORDER TRANSACTION PROCESSING USING REQUEST SIDE QUEUE POINTER AND RESPONSE SIDE QUEUE POINTER

BACKGROUND OF THE INVENTION

1. Field of the Invention

The present invention relates to an information processing system comprising a plurality of system modules, and more particularly to a method and apparatus for transferring transactions among the system modules. In particular, the present invention relates to a transaction transferring method and apparatus using a split transaction mode.

2. Description of the Related Art

Many information processing devices, such as computers or communication devices, use a transaction transferring mode in which a requesting system module reads data from, or writes data into, a responding system module. Such a transaction transferring mode uses, in most cases, a split transaction mode. In this mode, the requesting system module sends a request transaction (contents of request processing) to the responding system module, and the responding system module returns a response transaction (requested data, transaction processing result, and so on) to the requesting transaction module.

In the split transaction mode, the requesting system module frees the transfer route immediately after it issues a request transaction. When the responding system module becomes ready for returning a response transaction, it acquires a transfer route and issues a response transaction. In this mode, an issued requesting transaction does not wait for a response with the transfer route reserved and, therefore, the responding system module can process a plurality of request transactions concurrently. In some cases, a requesting transaction and a responding transaction use different transfer routes.

However, if the responding system module must return request transactions in the order in which they were issued, a time-consuming request transaction would keep all subsequent transactions waiting long.

A prior art that solves this problem is disclosed, for example, in Japanese Patent Laid-Open Publication No. Hei 6-149730. The method disclosed in Japanese Patent Laid-Open Publication No. Hei 6-149730 is that a special signal for transferring transaction IDs is provided on the transfer route from the requesting system module to the responding system module and on the transfer route from the responding system module to the requesting system module. Using this signal, the requesting system module adds an ID, prepared by the requesting system module, to a request transaction. The responding system module receives this request transaction and returns the response transaction with this ID added. Because the requesting system module uses an ID, added to the response transaction, to associate the response transaction with the corresponding response transaction, the responding system module may return response transactions in any order. Therefore, even if a time-consuming request transaction is in the wait state, the responding system module may return responses to the request transactions that follow the time-consuming request transaction.

The method according to the prior art requires IDs to be transferred between the requesting system module and the responding system module. One way to implement this method is to provide a special signal line for transferring IDs. However, an additional special signal line increases the number of signal lines of the transaction transfer route. Another way is to transfer IDs over an another existing signal line. However, this method lengthens a transaction that passes through the transfer route and therefore decreases transfer performance. In particular, in an information processing system where a plurality of requesting system modules are connected to a responding system module or where a requesting system module is connected to a plurality of responding system modules, a plurality of special ID-transferring signal lines must be connected to the requesting system module in the former case and to the requesting system module in the latter case.

For example, in a system where eight nodes, each composed of a processor, a memory, and I/O devices, are connected via a cross bus switch, request transactions and response transactions are transferred bi-directionally between each of the nodes and the cross bus switch. So, if the transaction ID is 8 bits long, as many as 128 (8 bits×8 nodes×2 [request and response]) special ID-transferring lines are required for the cross bus switch.

SUMMARY OF THE INVENTION

It is an object of the present invention to provide a method and apparatus that allow a responding system module to issue response transactions in an order different from the request transaction reception order without transferring transaction IDs between the requesting system module and the responding system module.

The information processing system according to the present invention uses the split transaction mode. That is, the request side system module issues a request transaction to the response side system module. In response to this request transaction, the response side system module issues a response transaction to the request side system module. Response transactions returned from the response side system module to the request side system module include transactions that control the transaction order.

More specifically, the request side system module and the response side system module each memorize the order in which request transactions were issued. The request side system module has a request side pointer pointing to the request transaction to which a response is to be returned next. The response system module has a response side pointer pointing to the request transaction corresponding to the response transaction to be issued next. When the response system module is to issue a response transaction corresponding to the request transaction different from that pointed to by the request side pointer, the response side system module issues a transaction that changes the value of the request side pointer. In response to this transaction, the request side system module changes the value of the request side pointer. After issuing the transaction, the request side system module changes the value of the response side pointer. As a result of the change, the request side pointer and the response side pointer point to the same request transaction.

Typically, two transactions are provided. One is a transaction for changing the value of the request side pointer; this transaction increments the value of the request side pointer by one. The other is a transaction that resets the request side pointer to the beginning of the request side pointer. These two transactions are used in combination. It is possible to increment the pointer value by N instead of 1. It is also possible to use a transaction that causes the pointer to point to any desired position.

DESCRIPTION OF THE EMBODIMENTS

Some embodiments of the present invention will be described in detail with reference to the attached drawings.

First Embodiment

A first embodiment of the present invention will be described with reference to FIGS. 1–2.

In this embodiment, a requesting system module 100 and a responding system module 105 are connected by a transaction transferring apparatus according to the present invention. A request side interface unit 110 (see the description below for details) is connected to the requesting system module 100, while a response side interface unit 150 (see the description below for details) is connected to the responding system module 105. Transactions may be transferred in any order between the requesting system module 100 and the responding system module 105 via the request side interface unit 110 and the response side interface unit 150.

Figure 1:
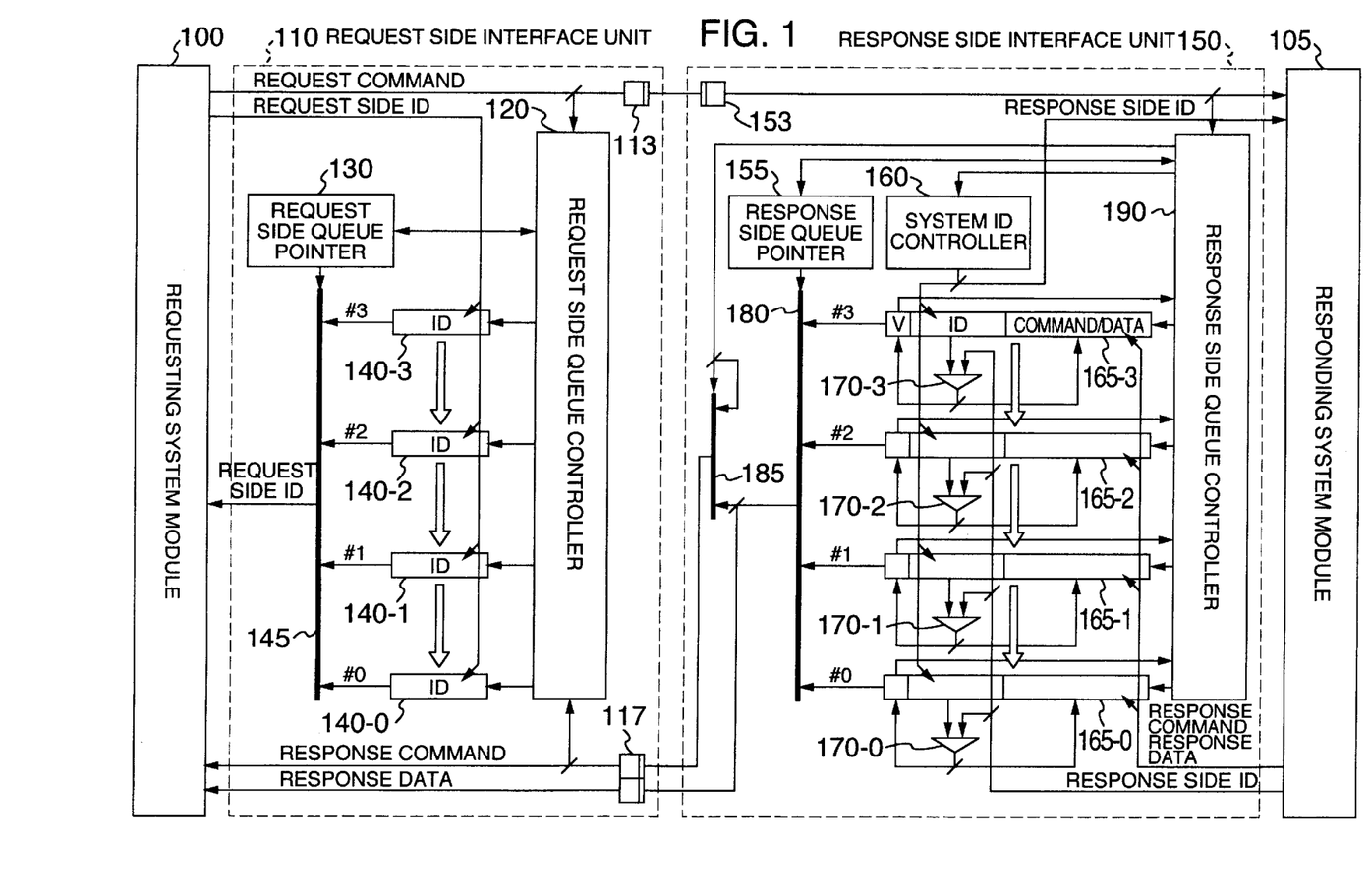
FIG. 1 is a diagram showing transaction transferring apparatus in a first embodiment of the present invention.

In the description of this embodiment, it is assumed that, for convenience, transactions processed by the apparatus shown in FIG. 1 are only read-data transactions the requesting system module 100 issues to the responding system module 105. However, the present invention is not limited to the read transactions but may be applied to transactions in general.

The following describes the overview of transaction transfer processing:

(1) The requesting system module 100 sends a request transaction, composed of a request command and a request side ID, to the request side interface unit 110.

(2) The request side interface unit 110 stores therein the request side ID in order of issuance. At the same time, the request side interface unit 110 transfers only the request command of the request transaction to the response side interface unit 150.

(3) The response side interface unit 150 adds a response side ID to the accepted request transaction and transfers the request command and the added response side ID to the responding system module 105. The response side interface unit 150 also stores therein a response side ID in order of request transaction issuance.

(4) The responding system module 105 processes the request transaction accepted from the response side interface unit 150 in an order independent of request transaction issuance. The responding system module 105 reads data and returns it to the response side interface unit 150 as a response transaction (response command, response data, and response side ID) as soon as the requested data is made available.

(5) The response side interface unit 150 accepts the response transaction from the responding system module 105. After that, the response side interface unit 150 returns only the response command and the response data of the response transaction to the request side interface unit 110.

(6) The request side interface unit 110 adds the corresponding request side ID to the response transaction. It then returns the response transaction to the request side interface unit 110 as a set of the response command, response data, and request side ID.

The apparatus in this embodiment allows the response side interface unit 150 to return response transactions, with no ID transferred, in an order different from that the requesting system module 100 issued request transactions.

To accomplish this, the request side interface unit 110 and the response side interface unit 150 each memorize the order in which the requesting system module 100 issued request transactions to the responding system module 105. Basically, the response side interface unit 150 returns response transactions to the request side interface unit 110 in the order request transactions were issued. To change this response transaction order, the response side interface unit 150 transfers two types of pointer control transactions described below, SKIP and BACK, to the request side interface unit 110. These pointer control transactions allow the request side interface unit 110 to identify, without using IDs, which response transaction it will receive next.

SKIP pointer control transaction

This transaction causes the response side interface unit 150 to postpone the response to the immediate request transaction but to move to the next request transaction. At the same time the response side interface unit 150 issues this transaction, it increments the pointer to the immediate request transaction (response side queue pointer 155; see the description below for details) by one to point to the next request transaction. When the request side interface unit 110 receives this transaction, it increments the pointer to the immediate request transaction (request side queue pointer 130; see the description below for details) by one to point to the next request transaction.

BACK pointer control transaction

This transaction causes the response side interface unit 150 to return the oldest of the postponed request transactions. At the same time the response side interface unit 150 issues this transaction, it sets the response side queue pointer 155 to 0 to point to the oldest request transaction. When the request side interface unit 110 receives this transaction, it sets the request side queue pointer 130 to 0 to point to the oldest request transaction.

The SKIP pointer control transaction and the BACK pointer control transaction, when used appropriately, enable response transactions to be returned in any order.

Although SKIP and BACK transaction operations are used in the embodiment as an example of pointer control transactions, the present invention is applicable regardless of the processing mode of the pointer control transactions. Other pointer control transactions will be described below.

SKIP X and BACK X transactions

These transactions increment or decrement the request side queue pointer 130 and the response side queue pointer 155 by X, respectively.

SKIP(X)&response and BACK(X)&response transactions

These transactions increment or decrement the request side queue pointer 130 and the response side queue pointer 155 by (X), respectively, and then transfer the response transaction.

response&SKIP(X) and response&BACK(X) transactions

These transactions transfer the response transaction and then increment or decrement the request side queue pointer 130 or response side queue pointer 155 by (X), respectively.

SHIFT TO X transaction

This transaction moves the request side queue pointer 130 and the response side queue pointer 155 to the Xth (X is a positive number) entry in the queue.

Figure 2:
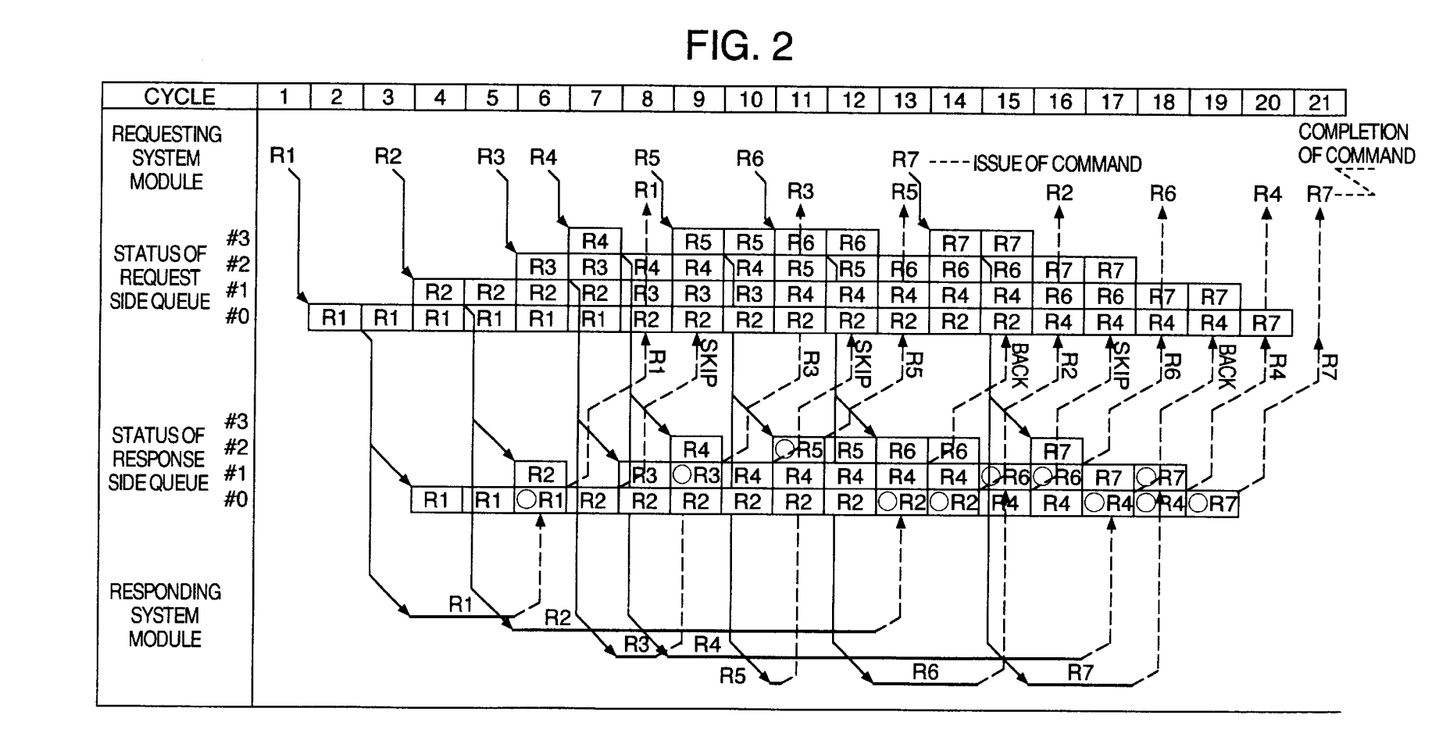
FIG. 2 is a diagram showing the flow of transaction transfer processing in the first embodiment of the present invention.

FIG. 2 shows, for each cycle, how request transactions ("Rx" in FIG. 2) issued by the requesting system module 100 are transferred to the responding system module 105 via the request side interface unit 110 and the response side interface unit 150 and how response data is returned in an order different from that the request transactions were issued.

The status of the request side queue shown in FIG. 2 illustrates the status of a request ID queue 140(0–3) (see the description below for details) in the request side interface unit 110. Request side IDs are registered in this queue in order of issuance.

The status of the response side queue shown in FIG. 2 illustrates the status of a response queue 165(0–3) (see the description below for details) in the response side interface unit 150. Request side IDs are registered in this queue in order of acceptance (that is, the order in which the requesting system module 100 issues transactions).

Referring to FIGS. 1 and 2, the transaction operation in each cycle will be described.

(Cycle 1)

R1 request issuance processing

The requesting system module 100 issues request transaction R1 to the request side interface unit 110. At this time, the request command includes the "read data" command and a read address. To the request side identifier (request side ID), the ID of R1 added by the requesting system module 100 is transferred. The request side interface unit 110 stores the request side ID of R1 into the request ID queue 140(0–3) and, at the same time, the request transaction into a request issuance buffer 113. In the description below, this processing is called request issuance processing.

(Cycle 2)

R1 request transfer processing

The request side interface unit 110 transfers the request transaction (excluding the request ID), stored in the request issuance buffer 113, to the response side interface unit 150. The response side interface unit 150 stores the request transaction into a request acceptance buffer 153. In the description below, this processing is called request transfer processing.

(Cycle 3)

R1 request acceptance & read issuance processing

The response side interface unit 150 adds a response side identifier (response side ID) to R1 and transfers the transaction to the responding system module 105. The response side interface unit 150 also stores the R1 response side ID into the response queue 165(0–3). In the description below, this processing is called request acceptance & read issuance processing.

R2 request issuance processing (same as that of R1)

(Cycle 4)

R2 request transfer processing (same as that of R1)

(Cycle 5)

R1 response data issuance processing

After the read processing requested by R1 is finished, the responding system module 105 sends a response transaction to the response side interface unit 150. The response transaction is composed of a response command that is "return read-data," the R1 response side ID added by the response side interface unit 150, and response data. When the response side interface unit 150 receives the R1 response transaction from the responding system module 105, it stores the response command and the response data into the corresponding entry (searched for by response side ID) of the response queue 165(0–3). Then, the response side interface unit 150 sets to 1 the data validity bit V of the response queue 165(0–3).

In the description below, this processing is called response data issuance processing.

R2 request acceptance & read issuance processing (same as that of R1)

R3 request issuance processing (same as that of R1)

(Cycle 6)

R1 response transfer processing

The response side interface unit 150 returns the R1 response transaction, which is the next response transaction (pointed to by response side queue pointer), to the request side interface unit 110. The response transaction is composed of a response command that is "return read-data" and response data. R1 is dequeued from the response queue after the response transaction is issued. When the request side interface unit 110 receives the response transaction, it stores the transaction into a response acceptance buffer 117. In the description below, this processing is called response transfer processing.

R3 request transfer processing (same as that of R1)

R4 request issuance processing (same as that of R1)

(Cycle 7)

R1 response acceptance processing

The request side interface unit 110 selects the request ID, corresponding to the response transaction stored in the response acceptance buffer 117, from the request ID queue 140(0–3) (pointed to by the request side queue pointer). The unit then adds the request ID to the response transaction and returns the response transaction to the requesting system module 100. R1 is dequeued from the request queue after the response transaction is returned. In the description below, this processing is called response acceptance processing.

R2 SKIP transfer processing

When the response side interface unit 150 finds that R2 will take long, it determines that the response to R2 be postponed. Thus, the response side interface unit 150 issues the SKIP special transaction to the request side interface unit 110. The SKIP special transaction is a transaction whose response command is "SKIP".

The response side interface unit 150, which issued SKIP to the request side interface unit 110 in the preceding cycle, increments the response side queue pointer by one. The request side interface unit 110 stores the SKIP special transaction into the response acceptance buffer 117. In the description below, this processing is called SKIP transfer processing.

R3 request acceptance & read issuance processing (same as that of R1)

R4 request transfer processing (same as that of R1)

(Cycle 8)

R2 SKIP acceptance processing

The request side interface unit 110 receives SKIP from the response acceptance buffer 117 and increments the request side queue pointer to the next transaction. Then, the response to R2 is postponed in both the request side interface unit 110 and the response side interface unit 150. In these units, R3 is recognized as the transaction to which a response will be returned next. In the description below, this processing is called SKIP acceptance processing.

R3 response data issuance processing (same as that of R1)

R4 request acceptance & read issuance processing (same as that of R1)

R5 request issuance processing (same as that of R1)

(Cycle 9)
R3 response transfer processing (same as that of R1)
R5 request transfer processing (same as that of R1)
(Cycle 10)
R3 response acceptance processing (same as that of R1)
R4 SKIP transfer processing (same as that of R2)
R5 request acceptance & read issuance processing (same as that of R1)
R5 response data issuance processing (same as that of R1)
R6 request issuance processing (same as that of R1)
(Cycle 11)
R4 SKIP acceptance processing (same as that of R2)
R5 response transfer processing (same as that of R1)
R6 request transfer processing (same as that of R1)
(Cycle 12)
R2 response data issuance processing (same as that of R1)
R5 response acceptance processing (same as that of R1)
R6 request acceptance & read issuance processing (same as that of R1)
(Cycle 13)
R2 BACK transfer processing The response side interface unit 150 receives data, which was requested by R2, from the responding system module 105 and becomes ready for R2 response transaction processing. Because R2 was postponed by SKIP, the request side queue pointer and the response side queue pointer must be reset to R2.

Therefore, the response side interface unit 150 issues the BACK special transaction to the request side interface unit 110. The BACK special transaction is a transaction whose response command is BACK. After issuing BACK, the response side interface unit 150 sets up the response side queue pointer 155 to point to R2 which is the first unprocessed transaction. The request side interface unit 110 stores the BACK special transaction into the response acceptance buffer 117. In the description below, this processing is called BACK issuance processing.
R7 request issuance processing (same as that of R1)
(Cycle 14)
R2 BACK acceptance processing The request side interface unit 110 receives BACK from the response acceptance buffer 117 and sets up the request side queue pointer 130 to point to R2 that is the first unprocessed transaction. Thus, in both the request side interface unit 110 and the response side interface unit 150, R2 is recognized as the transaction to which a response will be returned next. In the description below, this processing is called BACK acceptance processing.
R2 response transfer processing (same as that of R1)
R6 response data issuance processing (same as that of R1)
R7 request transfer processing (same as that of R1)
(Cycle 15)
R2 response acceptance processing (same as that of R1)
R4 SKIP transfer processing Because R6 response data, not R4 response data, was issued in cycle 14 that is the immediately preceding cycle, the response side interface unit 150 first determines that the R4 response be postponed again. Thus, the response side interface unit 150 issues the SKIP special transaction to the request side interface unit 110 and, at the same time, increments the response side queue pointer by one. On the other hand, the request side interface unit 110 performs SKIP transfer processing in which the SKIP special transaction is stored into the response acceptance buffer 117 (as in R2 SKIP transfer processing performed in cycle 7).
R7 request acceptance & read issuance processing (same as that of R1)

(Cycle 16)
R4 response data issuance processing (same as that of R1)
R4 SKIP acceptance processing (same as that of R2)
R6 response transfer processing (same as that of R1)
(Cycle 17)
R4 BACK transfer processing (same as that of R2)
R6 response acceptance processing (same as that of R1)
R7 response data issuance processing (same as that of R1)
(Cycle 18)
R4 BACK acceptance processing (same processing as that of R2)
R4 response transfer processing (same as that of R1)
(Cycle 19)
R4 response acceptance processing (same as that of R1)
R7 response transfer processing (same as that of R1)
(Cycle 20)
R7 response acceptance processing (same as that of R1)

In the transaction operation shown in FIG. 2, the request side interface unit 110 issues request transactions in order of R1, R2, R3, R4, R5, R6, and R7. On the other hand, the response side interface unit 150 returns response transactions in order of R1, R3, R5, R2, R6, R4, and R7.

In the embodiment described above, the request side interface unit 110 has the request ID queue 140(0–3). This queue memorizes the order in which request transactions are issued to the request side interface unit 110. The request side queue pointer 130 points to an entry of this queue corresponding to the response transaction to be received next. The response side interface unit 150 has the response queue 165(0–3). This queue memorizes the order in which the request transactions are accepted. The response side queue pointer 155 points to an entry of this queue corresponding to the response transaction to be issued next. Two special pointer control transactions, SKIP and BACK, are provided as additional response side commands for changing the request transaction response order. The configuration and special pointer control transactions described above allow response transactions to be returned, with no ID transferred between the request side interface unit 110 and the response side interface unit 150, in an order different from that the request transactions are issued.

The operation of the request side interface unit 110 and the response side interface unit 150 will be described in detail.

(Request Side Interface Unit)

The request side interface unit 110 comprises a request side queue controller 120, the request side queue pointer 130, the request ID queue 140(0–3), and a request ID selector 145.

The request side queue controller 120 controls the request side queue pointer 130 and the request ID queue 140(0–3) when a request transaction is issued from the requesting system module 100 and when a response transaction is accepted from the response side interface unit 150.

The request side queue pointer 130 points to a request ID queue entry corresponding to the response transaction to be received next from the response side interface unit 150.

The request ID queue 140(0–3) contains the request IDs of request transactions in the order in which they are issued from the requesting system module 100. When a response transaction is received from the response side interface unit 150, the corresponding request ID is selected by the request ID selector 145 and is added to the response transaction. The request ID queue entries 140(0–3), #0 to #3, are arranged in order of transaction issuance. The request side interface unit 110 executes the operation below to process request transactions and response transactions.

Operation executed when a request transaction is issued:

The request side queue controller 120 has a pointer pointing to a free entry with the smallest entry number (request side free entry pointer). When a request transaction is received, the request side queue controller 120 stores the request ID of the request transaction into the request ID entry pointed to by the request side free entry pointer. Then, the request side queue controller 120 increments the request side free entry pointer.

Operation executed when a response transaction is received:

When a response transaction is received, the corresponding request ID (pointed to by the request side queue pointer 130) is selected from the request ID queue 140(0–3) by the request ID selector 145, added to the response transaction, and transferred to the requesting system module 100.

Then, the request side queue controller 120 deletes the request ID queue 140(0–3) entry added to the response transaction and shifts the request ID queue entries, each with a larger entry 140(0–3) number, one position. That is, the request side queue controller 120 moves entry 140-1 to entry 140-0, entry 140-2 to entry 140-1, and entry 140-3 to entry 140-2, as necessary. After that, the request side queue controller 120 decrements the request side free entry pointer by 1.

The above operation maintains the order of the request ID queue 140(0–3).

Operation executed when SKIP transaction is received:

When the SKIP transaction is received, the request side queue controller 120 increments the request side queue pointer 130. This postpones the transfer of the transaction currently pointed to by the request side queue pointer 130.

Operation executed when BACK transaction is received:

When the BACK transaction is received, the request side queue controller 120 sets the request side queue pointer 130 to 0. This causes the request side queue pointer 130 to point to the first postponed transaction.

(Response Side Interface Unit)

The response side interface unit 150 comprises a response side queue controller 190, the response side queue pointer 155, a system ID controller 160, the response queue 165 (0–3), comparators 170(0–3), a response transaction selector A 180, and a response transaction selector B 185.

When a request transaction is received from the request side interface unit 110 or when a response transaction is received from the responding system module 105, the response side queue controller 190 controls the response side queue pointer 155, system ID controller 160, response queue 165(0–3), and response transaction selector B 185.

The response side queue pointer 155 points to the response queue 165(0–3) entry corresponding to the response transaction to be issued next to the request side interface unit 110.

The system ID controller 160 adds the response side ID to a request transaction accepted from the request side interface unit 110.

The response queue 165(0–3) contains the response side IDs in order of acceptance. The system ID controller 160 adds these IDs to the request transactions received from the request side interface unit 110.

When a response transaction is received from the responding system module 105, the comparator 170(0–3) searches for the response queue 165(0–3) entry corresponding to the response transaction. The received response transaction is stored in that entry. The response transaction stored in the response queue 165(0–3) is then returned to the request side interface unit 110.

The response ID queue 165(0–3) entries, #0–#3, are arranged in order of transaction acceptance. The response side interface unit 150 executes the operation described below to process request transactions and response transactions.

Operation executed when a request transaction is received:

The response side queue controller 190 has a pointer (response side free entry pointer) pointing to a free entry with the smallest entry number. When a response transaction is received, the response side queue controller 190 stores the response side ID of the request transaction, generated by the system ID controller 160, into the response entry pointed to by the response side free entry pointer. After that, the response side queue controller 190 increments the response side free entry pointer. The request transaction, with the response side ID added, is issued to the responding system module 105.

Operation executed when a response transaction is accepted:

When a response transaction is accepted, the comparator 170(0–3) compares the response side ID stored in each of response queue 165(0–3) entries with the response ID of the received response transaction. The response command and response data of the response transaction are stored in the entry with the matching response side ID. At this time, the V bit of the entry is set to 1 to indicate that the response transaction has been stored.

Operation executed when a response transaction is issued:

The response side queue controller 190 checks the response side queue pointer 155 and the V bit of the response queue 165(0–3). As a result, the response side queue controller 190 finds that the response transaction has been stored in the response queue 165(0–3) entry pointed to by the response side queue pointer 155. At this time, the response side queue controller 190 controls the response transaction selector B 185 to return the response transaction (excluding the response side ID) to the request side interface unit 110.

After that, the response side queue controller 190 deletes the response queue 165(0–3) entry and shifts the response queue 165(0–3) entries, each with a number larger than that of the deleted entry, one position. That is, entry 165-1 is moved to entry 165-0, entry 165-2 is moved to entry 165-1, and entry 165-3 is moved to entry 165-2, as necessary. Then, the request side queue controller 120 decrements the response side free entry pointer by one.

The above operation maintains the order of the response queue 165(0–3).

Operation executed when the SKIP transaction is issued:

The response side queue controller 190 checks the response side queue pointer 155 and the V bit of the response queue 165(0–3) entries. As a result, the response side queue controller 190 finds that the response transaction is not yet stored in the response queue entry pointed to by the response side queue pointer 155 and that the response transaction has been stored in the next response queue entry. At this time, the response side queue controller 190 controls the response transaction selector B 185 to return the SKIP transaction to the request side interface unit 110.

After that, the response side queue controller 190 increments the response side queue pointer 155. This allows the transfer of the transaction, currently pointed to by the response side queue pointer 155, to be postponed.

Operation executed when the BACK transaction is issued:

The response side queue controller 190 checks the response side queue pointer 155 and the V bit of the response queue 165-0 entry. As a result, the response side queue controller 190 finds that the response queue pointer is not 0 and that a response transaction is stored in response queue entry 165-0. At this time, the response side queue controller 190 controls the response transaction selector B 185 to return the BACK transaction to the request side interface unit 110.

After that, the response side queue controller 190 sets the response side queue pointer 155 to 0. This allows the transfer of the transaction, postponed by the SKIP transaction, to be started.

The first embodiment of the present invention is as described above.

In the embodiment described above, the request side interface unit 110 has the request ID queue 140(0–3). This queue memorizes the order in which request transactions are issued to the request side interface unit 110. The request side queue pointer 130 points to an entry of this queue corresponding to the response transaction to be received next. The response side interface unit 150 has the response queue 165(0–3). This queue memorizes the order in which the request transactions are accepted. The response side queue pointer 155 points to an entry of this queue corresponding to the response transaction to be issued next. Two special pointer control transactions, SKIP and BACK, are provided as additional response side commands for changing the request transaction response order. The configuration and special pointer control transactions described above allow response transactions to be returned, with no ID transferred between the request side interface unit 110 and the response side interface unit 150, in an order different from that the request transactions are issued.

This embodiment eliminates the need for IDs to be transferred between the requesting system module and the responding system module or for a transaction to be lengthened for accommodating the ID field, thus implementing an effective interface.

Second Embodiment

Figure 3:
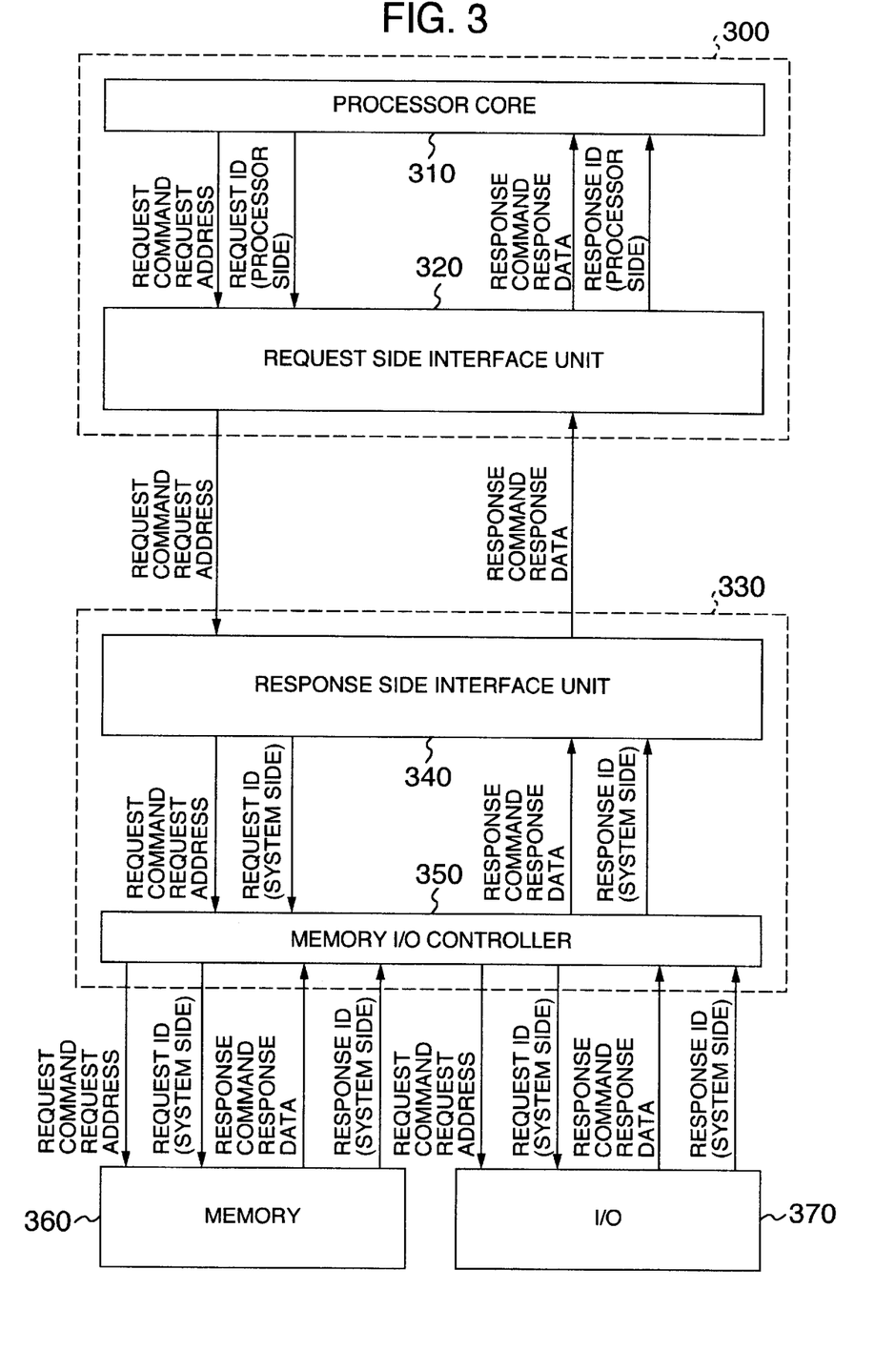
FIG. 3 is a diagram showing the configuration of a computer system in a second embodiment of the present invention.

Referring to FIG. 3, a second embodiment of the present invention will be described.

In this embodiment, the transaction transferring method according to the present invention is applied to the connection between the processor of a computer and a memory I/O system controller.

The computer shown in FIG. 3 comprises a processor 300, a memory 360, and an I/O device 370 that are connected via a system controller 330. For convenience, it is assumed that the transactions processed by the computer in FIG. 3 are only read transactions issued from the processor 300 to the memory 360 or the I/O device 370. It should be noted, however, that the present invention is not limited to read transactions but that the present invention may be applied to all transactions processed by the computer and to all transaction transfer routes in the computer.

The processor 300 comprises a processor core 310 and a request side interface unit 320. The request side interface unit 320 has a configuration similar to that of the request side interface unit in the first embodiment.

When the processor 300 issues a request transaction to the system controller 330, it does not transfer its ID to a system controller 330. Instead, the processor 300 maintains it in the request side interface unit 320 in order of request transaction issuance.

The system controller 330 comprises a response side interface unit 340 and a memory I/O controller 350. The response side interface unit 340 has a configuration similar to that of the response side interface unit in the first embodiment.

The system controller 330 adds the system side ID (response side ID) to the request transaction the response side interface unit 340 received from the processor 300. The response side ID is determined independently of the request ID created in the processor 300.

The response side interface unit 340 maintains the request transactions, accepted from the processor 300, in the response queue in order of request transaction issuance.

The split transaction mode interface is employed between the processor 300 and the system controller 330. That is, the processor 300 issues a read request transaction for reading data from the memory 360, or a read request transaction for reading data from the I/O device 370, to the system controller 330. Upon receiving the request transaction, the system controller 330 reads data from the memory 360 or from the I/O device 370. The system controller 330 then returns the data to the processor 300 as a memory data response transaction or as an I/O data response transaction.

In this embodiment, the system controller 330 is able to return response transactions, with no ID transferred, in an order different from that the processor 300 issued request transactions.

To accomplish this, the processor 300 and the system controller 330 each memorize the order in which the processor 300 issues request transactions to the system controller 330. Basically, the system controller 330 returns response transactions to the processor 300 in the order the request transactions were issued. To change this response transaction order, the two types of pointer control transactions shown in the first embodiment, SKIP and BACK, are transferred to the processor 300. These commands allow the processor 300 to identify, without using IDs, the next response transaction to be returned.

In the embodiment described above, both the processor 300 and the system controller 330 memorize the order in which request transactions were issued. The two types of pointer control transactions, SKIP and BACK, are provided as additional response commands for changing the request transaction response order. These commands allow response transactions to be returned, with no ID transferred between the processor 300 and the system controller 330, in an order different from that request transactions were issued. This embodiment eliminates the need for IDs in the interface between the processor 300 and the system controller 330 or for a transaction to be lengthened for accommodating the ID field, thus implementing an effective interface.

Third Embodiment

Figure 4:
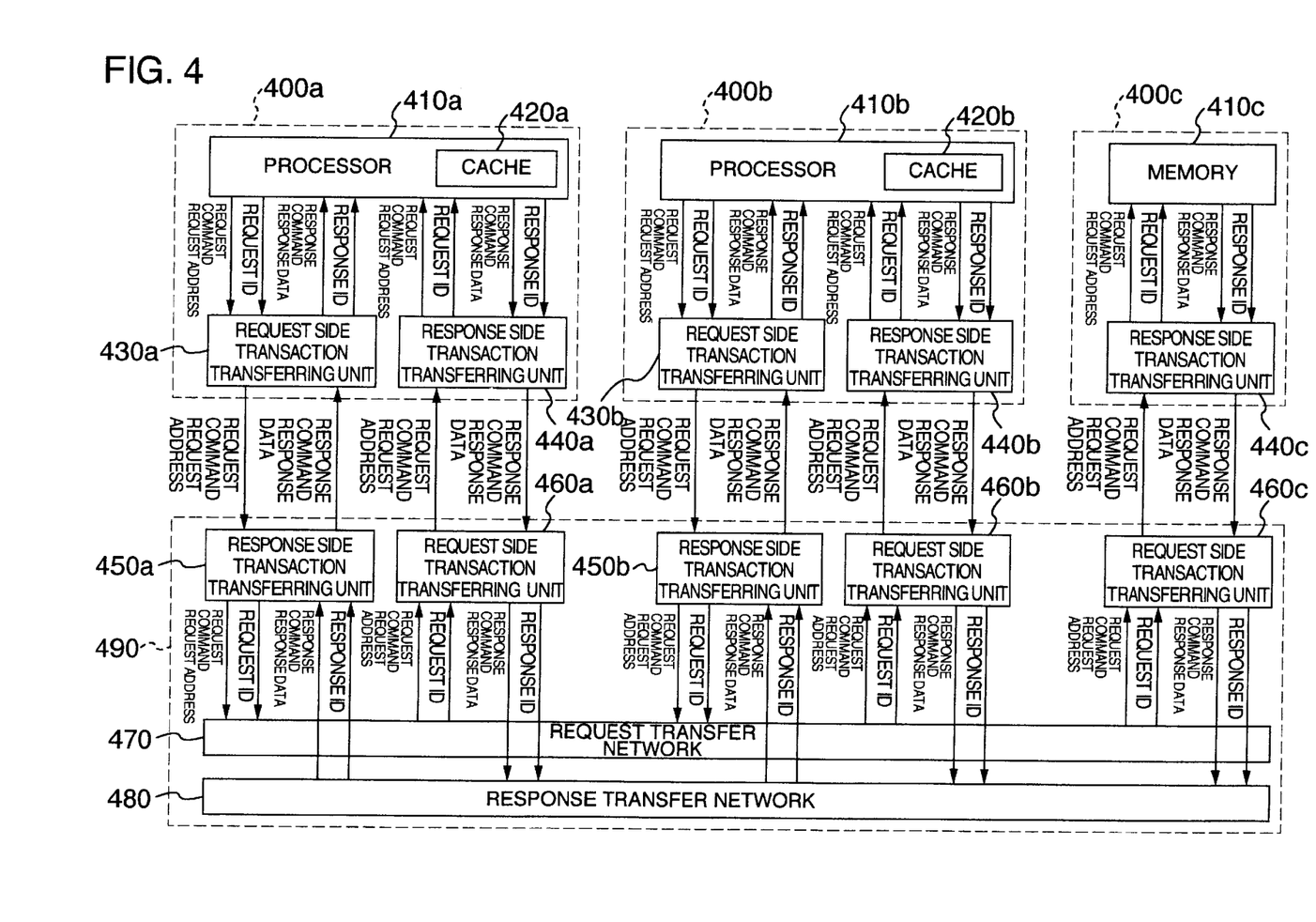
FIG. 4 is a diagram showing the configuration of a computer system in a third embodiment of the present invention.

Referring to FIG. 4, a third embodiment of the present invention will be described.

In this embodiment, the transaction transferring method according to the present invention is applied to the connection between the processor nodes of a parallel computer, a memory node, and an inter-linked network connecting these nodes.

The parallel computer in FIG. 4 comprises processor nodes 400a and 400b and a memory node 400c, all connected by an inter-linked network 490. The processor node 400a(400b) comprises a processor 410a(410b) having cache memory 420a(420b), a request side interface unit 430a (430b) via which a transaction issued from the processor 410a(410b) to the inter-linked network 490 is transferred, and a response side interface unit 440a(440b) via which a transaction issued from the inter-linked network 490 to the processor 410a(410b) is transferred.

The memory node 400c comprises a memory 410c and a response side interface unit 440c via which a transaction issued from the inter-linked network 490 to the memory 410c is transferred.

The inter-linked network 490 comprises the following components: response side interface units 450a and 450b via which a transaction issued from the processors 410a or 410b to the inter-linked network 490 is transferred; request side interface units 460a–460c via which a transaction issued from the inter-linked network 490 to the processors 410a, 410b, and the memory 410c is transferred; a request transfer network 470 via which a transaction, issued from the processor 410a or 410b to the response side interface units 450a or 450b, is transferred to the request side interface units 460a–460c in order to transfer the transaction to the processor 410a, 410b and the memory; and a response transfer network 480 via which a response transaction issued from the processor node 400a, 400b, or memory node memory node 400c is transferred.

Each processor (for example, 410a) performs processing while accessing the memory 410c. At this time, there is a possibility that another processor (other than 410a) has read the memory line into cache. Therefore, at the same time a processor accesses the memory 410c, it is necessary to perform cache matching control operation for other processor nodes (other than 400a).

In this embodiment, it is assumed, for convenience of description, that only two types of transactions are transferred within the parallel computer: one is a read-memory transaction issued when the processor 410a or 410b reads memory and the other is a cache matching control transaction. It should be noted, however, that the present invention is not limited to those transactions but that the present invention may be applied to all transactions transferred within the parallel computer.

Furthermore, in the embodiment that is shown, the processor nodes 400a and 400b each have one processor, 410a or 410b, and there is only one memory node 400c. The present invention is not limited to a parallel computer that satisfies this condition but may be applied to a parallel computer with any configuration. For example, the memory need not be a standalone node. Instead, memory may be distributed to a plurality of processor nodes. And, a processor node may have a plurality of processors. Although not shown in the figure, I/O devices may be included in each processor node. A standalone node including only I/O devices is also possible. The present invention is applicable to all these configurations.

The processor 410a in the parallel computer in FIG. 4 reads data from memory as follows:

(1) The processor 410a issues a read-memory request transaction to the request side interface unit 430a. The read-memory request transaction is composed of a request command, a request address, and a request ID.

(2) The request side interface unit 430a transfers the request command and the request address of the read-memory request transaction to the response side interface unit 450a in the inter-linked network 490. Assume that the request side interface unit 430a and the response side interface unit 450a each have the configuration similar to that of the units used in the first embodiment. Therefore, when transferring the request command and the request address, the request side interface unit 430a saves the request ID, corresponding to the transferred request command and the request address, into the request side queue.

(3) The response side interface unit 450a associates a unique request ID with the transferred read-memory request transaction and stores the request ID into the response side queue. Moreover, the response side interface unit 450a transfers the read-memory request transaction and an inter-linked network local ID to the request side interface unit 460c via the request transfer network 470. Also, the response side interface unit 450a creates a cache-matching control request transaction and transfers it, as well as the inter-linked network local ID, to the request side interface unit 460b via the request transfer network 470.

Note that the inter-linked network local ID is an ID that uniquely identifies a waiting read-memory request transaction that is one of those waiting in the whole interconnected link network 490. This inter-linked network local ID is created by adding the node number of the requesting processor to the request ID that is unique to the response side interface unit 450a. In FIG. 4, an inter-linked network local ID transferred with a request transaction is indicated simply as "request ID".

(4) The request side interface unit 460b transfers the cache-matching control request transaction to the response side interface unit 440b in the processor node 400b. Again, the request side interface unit 460b and the response side interface unit 440b each have the configuration similar to that of the units in the first embodiment. Therefore, before the transfer, the response side interface unit 440b stores the request address and the inter-linked network local ID, corresponding to the request address, into the request side queue in the response side interface unit 440b.

(5) The response side interface unit 440b associates the transferred cache-matching control request transaction with the request ID unique to the processor node 400b and stores the request ID into the response side queue. The response side interface unit 440b also transfers the request ID, as well as the cache-matching control request transaction, to the processor 410b.

(6) The processor 410b performs matching control operation on the cache memory 420b. It then returns the cache matching control operation result to the response side interface unit 440b as a cache-matching control response transaction. If the cache memory 420b does not contain the latest data, the cache matching control operation result is only the cache status. On the other hand, if the cache memory 420b contains the latest data, the cache matching control operation result is the cache status and the latest data.

(7) The response side interface unit 440b, which receives the cache-matching control response transaction, returns its data part (cache matching control operation result described above; shown as "response data" in FIG. 4) to the request side interface unit 460b. Each time the response side interface unit 440b receives the cache-matching control response transaction, it compares the response ID with the request ID stored in the response side queue. If the response is out of order, the response side interface unit 440b returns, before the transfer, a pointer control transaction, such as SKIP or BACK described in the first embodiment, to the request side interface unit 460b as a response command. That is, the response side interface unit 440b informs this out-of-order response condition in advance.

(8) The request side interface unit 460b adds the corresponding inter-linked network local ID to the returned response data (cache-matching control result) and sends the data to a response transfer network 480 in order to return the data to the requesting node. The correspondence between the returned response data and the inter-linked network local ID is indicated by the request side queue pointer detailed in the first embodiment. That is, the request side queue pointer, controlled by transferred pointer control transactions, always points to the queue entry corresponding to the response data to be transferred next. Note that, in FIG. 4, an ID transferred with a response transaction is described as a "response ID".

(9) In parallel with steps (4), (5), (6), and (7), the request side interface unit 460*c* transfers the request command and the request address of the read-memory request transaction to the response side interface unit 440*c* in the memory node 400*c*. Again, the request side interface unit 460*c* and the response side interface unit 440*c* have the configuration similar to that of units in the first embodiment. Therefore, when transferring the request command and the request address, the request side interface unit 460*c* saves the inter-linked network local ID, corresponding to the transferred request command and the request address, into the response-waiting request side queue. Each of the plurality of processor nodes, 400*a* and 400*b*, sends read-memory request transactions independently. Thus, interlinked network local IDs indicating read-memory request transactions from the plurality of processor nodes are mixed in the response-waiting request side queue in the request side interface unit 460*c*.

(10) The response side interface unit 440*c* associates the transferred read-memory request transaction with the request ID unique in the memory node 400*c* and stores this request ID into the response side queue. The response side interface unit 440*c* transfers the request ID, as well as the read-memory request transaction, to the memory 410*c*.

(11) The memory 410*c* adds, as the response ID, the corresponding request ID, which is unique in the memory node 400*c*, to the memory data that is read. Then, it returns the data to the response side interface unit 440*c* as a response transaction.

(12) The response side interface unit 440*c* returns the memory data included in the read-memory response transaction to the request side interface unit 460*c*. However, if there is an out-of-order response, pointer control transactions are sent, in advance, to the request side interface unit 460*c* as a response to inform it of the out-of-order condition.

(13) The request side interface unit 460*c* adds the corresponding inter-linked network local ID to the returned memory data. The unit then sends the data to the response transfer network 480 to send it back to the requesting node as a read-memory response transaction. Again, the correspondence between the returned memory data and the interlinked network local ID is indicated by the request side queue pointer in the request side interface unit 460*c*.

(14) The response transfer network 480 receives the cache-matching control response transaction and the read-memory response transaction from the request side interface units 460*b* and 460*c*. The network then checks the processor node number included in the response ID (inter-linked network local ID) of the transaction to find the response destination and generates a read-memory response transaction to be sent back to the processor node 400*a*. That is, if the cache-matching control response transaction includes the latest data output from the processor node 400*b*, the network discards the read-memory read result data and returns the latest data to the response side interface unit 450*a*. Conversely, if the cache-matching control response transaction does not include the latest data output from the processor node 400*b*, the network returns the read-memory result data to the response side interface unit 450*a*.

(15) The response side interface unit 450*a* returns the response data (data read from memory or cache) of the returned read-memory response transaction to the request side interface unit 430*a*. Again, if there is an out-of-order response command, the response side interface unit 450*a* sends pointer control transactions to the request side interface unit 430*a* as response commands to inform it of the out-of-order response condition.

(16) The request side interface unit 430*a* adds the corresponding response ID to the read-memory response transaction and returns it to the processor 410*a*. Again, the correspondence between the returned memory response transaction and the response ID is indicated by the request side queue pointer in the request side interface unit 430*a*.

As described above, the parallel computer in this embodiment uses transaction transferring apparatus, similar to that described in the first embodiment, between each node and the inter-linked network. For each of three transfers, that is, the transfer of a request transaction and its response between each access-requesting processor node and the inter-linked network, the transfer of a request transaction and its response between the link unit network and the memory node 400*c*, and the transfer of a request transaction sent from the inter-linked network to non-access-source processor nodes for cache-matching control and its response, both the requesting side and the responding side memorize the transaction issuance order. If there is an out-of-order response, pointer control transactions are sent from the responding side to the requesting side to change the response order. This configuration allows the response order to be changed in any transfer stage without transferring IDS identifying request transactions. The parallel computer in FIG. 4 has a total of 10 transaction transfer routes. Thus, compared with a method in which IDs are transferred to change the response order in the parallel computer in FIG. 4, the number of signal lines may be reduced by the number of bits of an ID×10'. Or, there is no need to lengthen a transaction to accommodate the ID field, making the interface more effective.

In the embodiments according to the present invention described above, the request side interface unit has a request ID queue. This queue memorizes the order in which request transactions are issued to the request side interface unit. The request side queue pointer points to an entry of this queue corresponding to the response transaction to be received next. The response side interface unit has a response queue. This queue memorizes the order in which request transactions are accepted. The response side queue pointer points to an entry of this queue corresponding to the response transaction to be issued next. Special pointer control transactions are provided as additional response side commands for changing the request transaction response order. The configuration and the special pointer control transactions described above allow response transactions to be returned, with no transaction IDs transferred between the request side interface and the response side interface, in an order different from that the request transactions are issued.

Therefore, when issuing response transactions in an order independent of the request issuance order, the embodiments according to the present invention eliminate the need for IDs to be transferred between the requesting system module and the responding system module. The embodiments also eliminate the need for a transaction to be lengthened for accommodating the ID field. Thus, the interface becomes more effective.

What is claimed is:

1. A transaction transferring method for transferring transactions between a request side system module and a response side system module, the method comprising the steps of:

issuing, by said request side system module, request transactions to said response side system module while memorizing an issuance order; and memorizing, by said response side system module, an acceptance order of the accepted request transactions and, if a response to a request transaction is to be returned in an order different from the acceptance order, transferring information on an order change to said request side system module, wherein the transfer of the request transactions and the response between said request side system module and said response side system module does not involve the transfer of IDs identifying the transactions.

2. Transaction transferring apparatus comprising:

a request side system module;

a response side system module; and transferring means for transferring information between said request side system module and said response side system module, said request side system module issuing request transactions requesting said response side system module to return responses, said response side system module returning the responses to the request transactions via said transferring means, wherein said request side system module comprises:
  memorizing means for memorizing an issuance order of the issued request transactions, and
  a request side pointer pointing to the request transaction to which the response is to be issued next, said request transaction being identified in the issuance order memorized in said memorizing means;

wherein said response side system module comprises:
  memorizing means for memorizing an acceptance order of the accepted request transactions,
  a response side pointer pointing to the request transaction to which the response is to be returned next, said request transaction being identified in the acceptance order, and
  means for changing, when the response is to be issued to another request transaction different from the request transaction pointed to by said response side pointer, a value of said response side pointer and, at the same time, issuing a pointer control transaction which instructs said request side system module to change a value of said request side pointer; and
  wherein said request side system module controls said request side pointer with the issued pointer control transaction.

3. The transaction transferring apparatus according to claim 2, wherein the pointer control transaction issued from said response side system module to said request side system module is a transaction instruction to increment said request side pointer by N, wherein N is a positive number.

4. The transaction transferring apparatus according to claim 2, wherein the pointer control transaction issued from said response side system module to said request side system module is a transaction instructing to decrement said request side pointer by N, wherein N is a positive number.

5. The transaction transferring apparatus according to claim 2, wherein the pointer control transaction issued from said response side system module to said request side system module is a transaction causing said request side pointer to point to an Nth request transaction of the request transactions to which the responses are not yet returned, wherein N is a positive number.

6. The transaction transferring apparatus according to claim 2, wherein the pointer control transaction is issued from said response side system module to said request side system module before or after the response to said another request transaction is processed.

7. A transaction transferring apparatus comprising:

a request side system module;

a response side system module; and transferring means for transferring information between said request side system module and said response side system module, wherein said request side system module issues request transactions requesting said response side system module to return responses, wherein said response side system module returns the responses to the
  request transactions via said transferring means, wherein said request side system module comprises:
  request side queue controlling means for storing the request transactions in a request side queue, said request transactions having been issued and waiting for the responses, and
  a request side pointer pointing to the request transaction to which the response is to be returned next, said request transaction being stored in said request side queue;

wherein said response side system module comprises:
  acceptance side queue controlling means for storing the request transactions in an acceptance side queue, said transactions having been accepted and waiting for the responses,
  a response side pointer pointing to the request transaction to which the response is to be returned next, said request transaction being stored in said acceptance side queue, and
  means for changing, when the response is to be issued to another request transaction different from the request transaction pointed to by said response side system module, a value of said response side pointer to point to the request transaction to which the response is to be returned and, at the same time, issuing a pointer control transaction which causes said request side system module to change a value of the request side pointer; and
  wherein said request side system module controls said request side pointer according to the issued pointer control transaction.

8. A transaction translation method for transferring transactions between a request side system module and a response side system module, the method comprising the steps of:

issuing, by said a request side system module, request transactions to said response side system module without designating IDs respectively identifying the request transactions while memorizing an issuance order;

memorizing, by said response side system module, an acceptance of the accepted request transactions;

returning, by said response side system module, responses to the accepted request transactions to said request side system module without designating IDs respectively identifying the responses; and if a response to a request transaction is to be returned in an order different from the acceptance order, transferring information on an order change from said response side system module to said request side system module so that the transfer of the request transactions and the responses between said request side system module does not involve the transfer of IDs identifying the transactions.

* * * * *